(No Model.)
J. S. IRWIN.
LABEL FORMER FOR GLASS MOLDS.
No. 490,966. Patented Jan. 31, 1893.
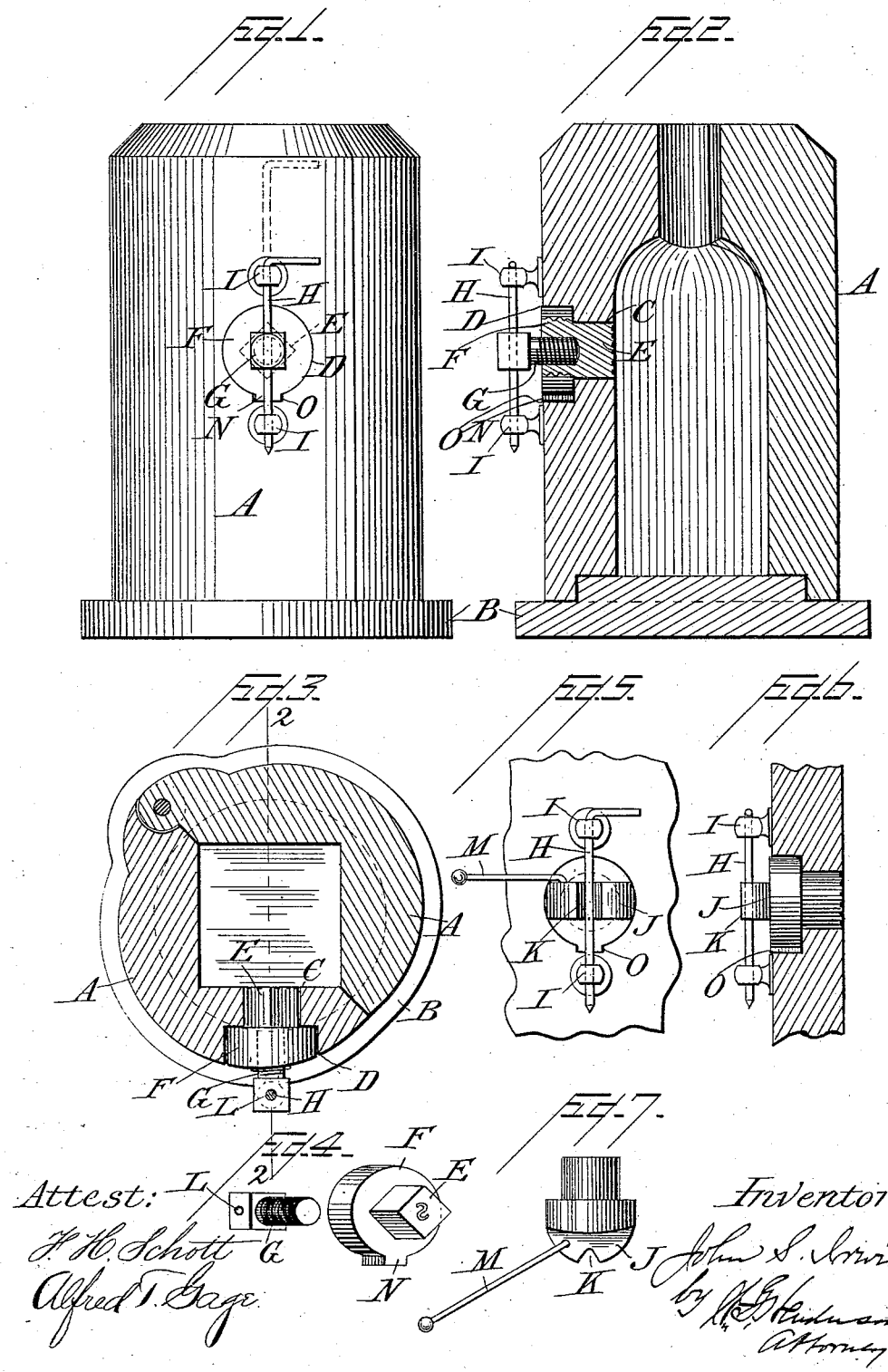
Attest:
F. H. Schott
Alfred T. Gage
Inventor
John S. Irwin
by W. F. Hudson
Attorney

UNITED STATES PATENT OFFICE.

JOHN SAMUEL IRWIN, OF SALTSBURG, PENNSYLVANIA.

LABEL-FORMER FOR GLASS-MOLDS.

SPECIFICATION forming part of Letters Patent No. 490,966, dated January 31, 1893.

Application filed June 2, 1892. Serial No. 435,243. (No model.)

*To all whom it may concern:*

Be it known that I, JOHN SAMUEL IRWIN, a citizen of the United States, residing at Saltsburg, in the county of Indiana and State of Pennsylvania, have invented certain new and useful Improvements in Label-Formers for Glass-Molds; and I do declare the following to be a full, clear, and exact description of the invention, such as will enable others skilled in the art to which it appertains to make and use the same, reference being had to the accompanying drawings, and to the letters of reference marked thereon, which form a part of this specification.
My invention relates to improvement in molds, more particularly to glass molds, and has for its object to provide a stamping or marking die for the mold not only applied at a point which will admit of its removal and replacement by another without the necessity of moving the mold from off its base but which will also be constructed so that it will not move in its seat and which will admit of adjustment so as to fit it accurately in its seat to give the best results in molding or marking; it also has for its object to provide improved means for holding the die in its seat.

To the accomplishment of the foregoing and such other objects as may hereinafter appear the invention consists in the construction and the combinations of parts hereinafter particularly described and then sought to be specifically defined by the claims, reference being had to the accompanying drawings forming a part hereof and in which Figure 1 is a side elevation of a two part glass mold with my invention applied thereto; Fig. 2 is a vertical section through the mold on the line 2—2 of Fig. 3; Fig. 3 is a cross section through the mold on the line of application of the die, the die being in full lines; Fig. 4 is a detail perspective view of the die and its adjusting screw; Fig. 5 is a side view of a portion of a mold having my invention applied thereto in a modified form of the die; Fig. 6 is a vertical section through Fig. 5 showing the die in full lines, and Fig. 7 is a plan view of the form of die illustrated in Figs. 5 and 6.
The letter A designates a two part glass mold in general construction of any approved form and resting upon the base or bed plate B. I form in the side of this mold a cavity C opening into the mold and having its outer portions enlarged as shown at D, the purpose of the cavity being to receive a die E having inscribed thereon the name of the person for whom the bottles are to be made, or other matter as desired, so that in the formation of the bottle the name or matter desired will be impressed or formed in the body of the bottle. The enlarged portion of the cavity is designed to receive a shoulder F formed on the outer portion of the die so as to limit the inward movement of the die in order that it may not extend too far into the bottle cavity of the mold. This die may in cross section be of any desired configuration.

I have illustrated in the drawings only two forms of configuration, one of them being of angular or diamond shape as illustrated in Figs. 3 and 4, and the other circular or round as indicated in Figs. 6 and 7; but it is to be understood that these may be of any other desired shape or configuration in cross section.

In all forms of the die I prefer to provide the die with an adjustable portion, for instance with an adjustable screw G entering the die from its outside so that when the die is placed in position in its seat formed by the cavity in the side of the mold if for any reason the portion of the die against which the locking means is made to bear should not extend out as far as the locking means or should extend out beyond such means, the adjustable screw can be adjusted so as to bring the bearing portion of the die, the screw being treated as a portion of the die, into line to register with the locking means.

The particular locking means illustrated in the drawings consists of a pin H which is designed to pass through two eyes I located on opposite sides of the die as illustrated in the drawings, this hook preferably being bent at its upper end at an angle to its length as illustrated clearly in Fig. 5 so that it will not drop through the eye but will be supported therein. The hook is designed to bear against the outer end of the die whether it be against the stationary lug J formed on the outside of the die or against the adjustable screw G, as illustrated in the drawings, or otherwise. After the die has been placed in position and the locking pin H adjusted it will bear against the outer portion of the die and prevent the latter from accidentally being displaced or shifted in its seat. This locking pin may be made to enter a notch K formed in the outer part of the die or to pass through an aperture L formed in the adjustable screw illustrated, as may be preferred. The function of the locking pin is the same no matter what be the details of construction of the outer portion of the die. It is preferred however to employ as a part of the die the adjustable screw G as previously stated so that if there should not be a complete register from any cause of the exterior of the die with the locking pin, the screw can be adjusted to the desired position to cause register with the locking pin so that the die can be securely locked in place and the inconvenience and disadvantages arising from failure of the locking pin and exterior of the die to register with each other may be overcome. It is also preferred to provide the die with a handle M preferably pivoted to a suitable part of the die so that by grasping said handle or lever the die may be easily manipulated in introducing and withdrawing it from its seat.

In order to insure against the die turning in its seat if the form thereof be such as to permit of turning unless special means be provided to prevent it, I provide the die with a tongue N and form in the body of the mold at its exterior a recess O to receive said tongue so that by the tongue fitting in said recess the possibility of the die turning in its seat is entirely guarded against. This tongue also serves to indicate the proper position in which to introduce the die so that the possibility of the die being inserted upside down or otherwise in an improper manner is guarded against.

Under the construction described the proper insertion of the die is insured under all circumstances; the possibility of its being pushed too far inward is prevented; the register of the exterior of the die or a portion thereof with the locking pin under all conditions is provided for; and the easy and expeditious removal of one die and replacing of it with another are provided for without the necessity of removing the mold from its base or bed for that purpose so that a great saving of time and labor is effected and expeditious operation obtained with the use of a single mold for forming articles of glass ware for different persons with the names of the individuals or other matter impressed upon the bottle without the necessity of employment of separate molds for each class of articles.

I have described with particularity the preferred construction of the several features of my invention but it is obvious that the details may be varied without departing from the spirit of the invention, and that some features of the invention may be employed without necessarily using all the features.

Having described my invention and set forth its merits what I claim is:—

1. In a label former for glass molds, the combination with the mold having an opening formed in its side for the insertion of the label die, said opening having its outer portion enlarged as shown at D to form a shoulder in the opening, of a label die, having its outer portion enlarged to form a shoulder F to bear against the shoulder inside the opening in the side of the mold, substantially as and for the purposes described.

2. In a label former for glass molds, the combination with the mold formed with an opening in its side to receive the label die, of a removable label die to fit in said opening, and a tongue formed on the wall of one of said parts to fit into a corresponding recess formed in the wall of the other part, said tongue lying inside of the opening in the mold when the label die is in place, to serve as an index for the proper insertion of the label die and to prevent the die from turning, substantially as and for the purposes described.

3. In a mold for forming glass articles in which the mold is formed with an opening for a die, the combination with the die and a cross rod for holding it in place in the mold, of an adjusting screw having its inner end bearing on the die for effecting a register with the cross rod, said rod being detachable and adapted to be connected with said screw after the latter has been adjusted to effect the register, substantially as and for the purposes described.

In testimony whereof I affix my signature in presence of two witnesses.

JOHN SAMUEL IRWIN.

Witnesses:
　WM. ROSEWELL,
　JOHN W. PORTSER.